US008506300B2

(12) United States Patent
Baranov et al.

(10) Patent No.: US 8,506,300 B2
(45) Date of Patent: Aug. 13, 2013

(54) FLIGHT SIMULATOR

(75) Inventors: Nikolai Alekseevich Baranov, Moscow (RU); Andrei Sergeevich Belotserkovski, Moscow (RU); Mikhail Igorevich Kanevski, Moscow (RU); Igor Vladimirovich Pasekunov, Moscow (RU)

(73) Assignees: Spetstekhnika, Moskovskaya (RU); FSBI Falpiar, Moscow (RU)

( * ) Notice: Subject to any disclaimer, the term of this patent is extended or adjusted under 35 U.S.C. 154(b) by 1193 days.

(21) Appl. No.: 10/565,527

(22) PCT Filed: Jul. 25, 2003

(86) PCT No.: PCT/RU03/00333
§ 371 (c)(1),
(2), (4) Date: Jan. 23, 2006

(87) PCT Pub. No.: WO2005/010848
PCT Pub. Date: Feb. 3, 2005

(65) Prior Publication Data
US 2006/0216674 A1    Sep. 28, 2006

(51) Int. Cl.
*F41G 3/26*    (2006.01)
(52) U.S. Cl.
USPC ............. 434/29; 340/500; 340/515; 340/945; 340/963; 340/968; 340/971; 340/973; 434/30; 434/46; 434/200; 446/7; 446/130
(58) Field of Classification Search
USPC ............... 434/29, 30, 46, 200; 340/973, 500, 340/515, 945, 963, 968, 971; 446/7, 130
See application file for complete search history.

(56) References Cited

U.S. PATENT DOCUMENTS 3,885,325 A * 5/1975 Sidoti .............................. 434/51
4,030,208 A * 6/1977 Carver et al. .................... 434/46
(Continued)

FOREIGN PATENT DOCUMENTS

| DE | 10039109 | 2/2002 |
|---|---|---|
| RU | 2087037 | 8/1997 |
| RU | 2088487 | 8/1997 |
| WO | WO 00/71985 | 11/2000 |

OTHER PUBLICATIONS

Jonathan M. Stern, "Microsoft Flight Simulator Handbook", 1995, p. 1-676.*
Richard G. Sheffield, "Jet Fighter School II: More Training for Computer Fighter Pilots", 1988, p. 1-22.*
Charles Gulick, "Runway USA: A Pilot's guide to destination cities in Flight Simulator", 1987, p. 1-12.*
Department of Transportation, "Aviation Weather for Pilots and Flight Operation Personnel", 1975, p. 1-128.*

(Continued)

*Primary Examiner* — Jack Yip
(74) *Attorney, Agent, or Firm* — Preston Smirman; Smirman IP Law, PLLC (57) ABSTRACT

The invention is embodied in the form of a flight simulator in the conditions of vortex danger and in conditions when a pilot is informed about the possibility to penetrate into said dangerous area of vortex sheddings produced by a vortex generator. The inventive simulator is embodies in the form of modular variants and comprises a module (9) for imitating vortex conditions for determining the trajectory and intensity of the vortex sheddings of vortex generators as the population of vorticity areas, a module (10) for imitating the action of vortex disturbances on an aircraft and for determining additional forces and torques induced by the vortex sheddings of vortex generators, a module (17) for the parameters of the dangerous area of the vortex disturbances, a warning module for calculating the vortex disturbances danger on a modulated control plane located in front of the aircraft at an anticipated distance therefrom equal to a distance which is covered by the aircraft during a selected forecast time and is sufficient for carrying out a flight maneuver by the aircraft in order to move away from the dangerous trailing vortex area.

7 Claims, 5 Drawing Sheets

(56) References Cited

U.S. PATENT DOCUMENTS

| | | | |
|---|---|---|---|
| 4,137,764 A | | 2/1979 | Hallock et al. |
| 4,137,765 A | | 2/1979 | Matsushita |
| 4,276,702 A | * | 7/1981 | Horwitz ............... 434/47 |
| 4,424,038 A | * | 1/1984 | Tingleff et al. ............ 434/2 |
| 5,009,598 A | | 4/1991 | Bennington |
| 5,036,480 A | * | 7/1991 | Zweifel et al. ............ 703/8 |
| 5,657,009 A | | 8/1997 | Gordon |
| 5,724,040 A | | 3/1998 | Watnick |
| 6,133,867 A | | 10/2000 | Eberwine |
| 6,177,888 B1 | * | 1/2001 | Cabot et al. ............ 340/968 |
| 6,184,816 B1 | * | 2/2001 | Zheng et al. ............ 342/26 R |
| 6,424,408 B1 | | 7/2002 | Ooga |
| 6,456,226 B1 | * | 9/2002 | Zheng et al. ............ 342/26 R |
| 6,563,452 B1 | * | 5/2003 | Zheng et al. ............ 342/26 R |
| 6,963,291 B2 | * | 11/2005 | Holforty et al. ............ 340/945 |
| 7,333,030 B2 | * | 2/2008 | Baranov et al. ............ 340/963 |
| 7,516,815 B2 | * | 4/2009 | Rose et al. ............ 181/224 |
| 8,000,848 B2 | * | 8/2011 | Baranov et al. ............ 701/14 |
| 2002/0075171 A1 | | 6/2002 | Kuntman |
| 2003/0222795 A1 | * | 12/2003 | Holforty et al. ............ 340/968 |
| 2005/0197811 A1 | * | 9/2005 | Ariyur ............ 703/8 |
| 2006/0244637 A1 | * | 11/2006 | Baranov et al. ............ 340/968 |
| 2007/0103340 A1 | * | 5/2007 | Baranov et al. ............ 340/968 |

OTHER PUBLICATIONS

G. Kurylowich, "A Method for Assessing the Impact of Wake Vortices on USAF Operations", Jul. 1979, Air Force Flight Dynamics Laboratory, Air Force Wright Aeronautical Laboratories, Air Force Systems Command, Wright-Patterson Air Force Base, pp. 1-111.*

Eric C. Stewart, "A Piloted Simulation Study of Wake Turbulence on Final Approach", 1998, NASA Langley Research Center, pp. 1-16.*

A.C. de Bruin, "S-Wake Assessment of Wake Vortex Safety Publishable Summary Report", May 2003, National Aerospace Laboratory NLR, pp. 1-76.*

Jongil Han, "Large Eddy Simulations of Aircraft Wake Vortices in a Homogeneous Atmospheric Turbulence", North Carolina State University, pp. 1-179.*

U.S. Appl. No. 10/565,531, filed Jul. 25, 2003, Baranov et al., WO 05/010554, Feb. 3, 2005.

U.S. Appl. No. 10/565,529, filed Jul. 25, 2003, Baranov et al., WO 05/010555, Feb. 3, 2005.

Hinton et al., "Development of a Wake Vortex Spacing System for Airport Capacity Enhancement and Delay Reduction"; The 19th Digitial Avionics Systems Conferences Prcceedings Oct. 7-13, 2000; vol. 1, pp. 3.E.6-1 thru 3.E.6-10.

* cited by examiner

FLIGHT SIMULATOR

This U.S. national phase application is based on and claims priority to international application PCT/RU2003/000333 that designated the United States of America and of which the entire description and drawings are incorporated herewith by reference.

FIELD OF THE INVENTION

The present invention is related with aeronautical engineering in particular with the aircraft simulators for training the pilots to control aircraft and for training the flight controllers in handling of aircraft traffic for different flying modes, during take-off and landing and special measures for prevention of nonstandard flight situations.

BACKGROUND OF THE INVENTION

At present there are well known two types of aircraft ground simulators in the world: the first one is destined for training the pilots in aircraft flight control for different flight modes and simulated situations occurring during the flight, and the second one is destined for training in pilot rescue practices for different simulated and emergency situations.

The aircraft simulator of Link (Meerovitch G. Sh. et al., *Aircraft Simulators and Flight Safety*, Air Transport, Moscow, p. 15, 1991) represents a simplified model of a single-seat airplane with the cabin fixed at a universal joint permitting the aircraft to perform simulated flight mission with changing angles of pitch, yaw, and roll. An instructor could be present to control the pilotage according to the given program. However, such simulators do not imitate emergency situations and training pilots in such situations.

The integrated aircraft simulator is well known (ibid., pp 28-31), which contains a cabin for the crew with cockpit panels equipped with simulators of necessary standard instruments, control system, working places for pilots, system for simulation of the outside situation, motion system, computer system, instructor and flight commander panel. The simulator is designated for training in flight procedures, flight control skills at different flight stages or in certain nonstardard situations. However, the training program for pilots does not contain imitation of emergency situations.

The virtual aircraft simulator is well known (RU, 2191432, C1), which contains in the cabin of real aircraft a working place for a training pilot, units of the objective control system and weapon control, adapter with the output connected with the input of the pilot protective helmet with the virtual glasses, through which the information is transmitted and received from the ground flight data processing unit containing the module for flight information, module for comparison of the aircraft control in real flight and in the training regime, module of configuration and flight data access, module for sensing pilotage elements, module for animation of the pilot panel and outside space, module of preflight training and testing, module of the database of calculated and registered flight data, module for control of training regimes.

The aircraft simulator is well known (RU, 2114460, C1), which contains the real aircraft with flight controls, their units and systems, sensors and automatic control system with connected sensors and power flight controls, terrain modeling units, generation units and outside situation displays, unit for data exchange with the flight control and other aircraft during formation flight; database of the training flight, signal processing unit including the device for calculation of navigational parameters, units for modeling acoustical effects, unit for simulation of the aircraft flight dynamics, unit for image formation of the instrumental panels, unit modeling operation of the aircraft systems and units.

The unified multifunctional aircraft simulator is well known (RU, 2087037, C1), which contains the computing system with program modules for realization of training scenarios, modules for objective control of a trainee and instructor, unified working places for the instructor, complex of unified working places for trainees, unit for flight information input, and database of training scenarios. The simulator calculating system imitates flight operation control, uncontrolled flight in case of control failure, presentation of flight information on the instrument panel and visualization system. Moreover, it provides the adequate artificial feel of control for the control stick, input of typical emergency situations caused by the failure of equipment or errors in 'piloting', according to the instructor list. The computer system also provides the operation of preventive or emergency pilot signalization units installed at the instrument panel or on cabin windshield. The simulated emergency situations can be accompanied by imitation of specific outer features, for example buffeting, shaking, and oscillations of angles of pitch, roll, etc.

However, the simulator allows carrying out training only on the basis of solutions of situational problems for the typical emergency situations.

In the real situation for cruise flight mode and during take-off and landing, aircraft can experience an effect of significant aerodynamic forces and moments, which could cause the loss of their stability, for example while flying in aerodynamic jets of high level of turbulence generated by vortex generators moving near the aircraft, as well as by immobile vortex generators, which undergo the airflows of high level of turbulence and vorticity.

It is well known that flying aircraft generate the so called 'wake vortices.' The aircraft encounter with wake vortices generated by another object, for example by another aircraft, results in the substantial change of the angles of attack and sideslip. The aircraft experiences aerodynamic forces and moments that can throw it aside from the wake and while flying at low altitudes, for example, during takeoff and landing, can lead to hazard situations due to the impossibility of compensating such the effects by means of the aircraft controls.

The appearance of aircraft with wings of low aspect ratio and with high wing loading tends in the raise of wake vortex intensity increasing the hazard for aircraft entering the wake.

A lot of research work on transport and decay of vortices shows that the atmospheric factors such as wind, windshear, stratification, and turbulence play an important role in these processes.

There is a potential for optimizing the safe separations between aircraft during landing, takeoff and cruise flight on the basis of reliable forecasting of wake vortex dynamics with due regard for current weather conditions and now-casting and in-ground effect on wake vortex dynamics.

One of the main trends for decision of the problem of aircraft safe flight, when the determinant factor is wake vortices, is the selection of flight modes ensuring the required safety level. Therefore the great attention should be paid to pilot training in their estimation of different flight situations and decision-making for the corresponding flight maneuver.

Contrary to Russian flight safety systems oriented mainly to operations of pilots according to their personal analysis of the situation and flight conditions, the foreign flight safety systems are destined mainly for the use under the so called 'Instrument Flight Rules' when aircraft are controlled on the basis of flight controller commands implemented by pilots or in automatic mode. In such conditions it is appropriate to train pilots and controllers on the same situational tasks related with aircraft possible encounter with wake vortex danger areas in order to increase their skill in adequate evaluation of the situation and in seeking ways of preventing nonstandard situations.

The provision in simulator a possibility of simulation of most adequate wake vortex situations that may lead to flight incidents is the task of an utmost importance.

The goal of such training is to set a certain appearance of operational sequence for pilots or operators for different versions of visual and signal information provided to them; moreover the creation of experimental emotional and stress situation. The pilots or operators memorize the operational sequence appearance and fix their attention on their feeling.

However, as it is well known, that the decision-making in emergency situations is the most difficult operation in the operator activities. It consists of two stages: identification of the situation and determination of activity order to eliminate it. The operator, before proceeding any operation, should envisage his further steps. The perception of visual and voice signals in verbal form from a long-term memory, from indication means, or aurally needs a certain time under the time deficiency. The time for perception of graphic symbols is far less; and identification of the situation with the indication of the selected image zones permits to improve also the decision-making adequacy. Moreover, the effect of such physical factor as acceleration causes the detraction of pilot brain circulation, which may force even the short loss of consciousness under emotional and nervous tension. Therefore the provision of information necessary for decision-making to pilots or to flight controllers is preferable in graphical symbols before the actual decision-making time.

SUMMARY OF THE INVENTION

The goal of the invention is the development of a simulator for training in pilotage of aircraft under the wake vortex danger and in execution of flight evasion maneuvers from vortex generator danger areas.

When creating the invention, the task was set to develop a simulator that may provide the training pilot with necessary information on intensity and structure of wake vortices acting on the aircraft. The information should be sufficient for estimation of vortex situation at the forecasted time and for selection of a flight evasive maneuver preventing the aircraft encounter with wake vortex danger areas by means of determination of wake vortex path and intensity and indication of the points, at which the forecasted dynamic effects on the aircraft induced by wake perturbations may lead to abnormal situations at the forecasted time.

The task in hand was resolved by creation of aircraft simulator for training in pilotage under wake vortex hazard, which contains the following:

The module for control of the simulator modes capable of choosing a training scenario and controlling operation of the simulator modules, The training scenarios database module, The module for commutation of the simulator modules, The module for imitation of outside visual situation, visual part of the air space and ground surface in real time, The module for simulation of the pilot workplace, The module for simulation of the aviation instrument panel with indication of the of aircraft engine modes, The module for simulation of the controls for the aircraft units and systems, The module for simulation of the ambient parameters, The module for simulation of the wake vortex situation capable of determining the vortex generator wake vortex path as the set of the vorticity region centers and intensity on the basis of information from the training scenarios database module and of information from the module for simulation of the ambient parameters, The module for simulation of wake vortex perturbation effects on the aircraft capable of evaluation of the aircraft additional forces and moments induced by the vortex generator wake vortices on the basis of information on the wake vortex path and intensity received from the module for simulation of the wake vortex situation, of information on the aircraft parameters received from the training scenarios database module, and of information on the aircraft position, flight velocity, angular rates, and geometrical characteristics received from the module for simulation of the aircraft dynamics, The module for simulation of the aircraft dynamics capable of forming signals imitating the aircraft forces and moments according to the training scenario, as well as additional forces and moments induced by the vortex generator wake vortices, and transmitting the signals to the module for simulation of the pilot workplace, module for simulation of the aviation instrument panel, and module for imitation of outside visual situation on the basis of information from the module for simulation of wake vortex perturbation effects on the aircraft, from the training scenarios database module, and from the module for simulation of the controls for the aircraft units and systems The system for evaluation of the pilot actions capable of estimating correctness of the pilot actions against the flight situation hazardous for the aircraft on the basis of information received from the module for imitation of outside visual situation and the module for simulation of the instrument panel.

According to the invention, it is appropriate that the module for simulation of the pilot workplace is developed with the possibility of changing its attitude and equipped with the unit for the flight dynamic simulation.

According to the invention, it is preferable that the module for simulation of vortex situation should contain:

The unit for simulation of vortex generator dynamics including the vortex generator tracker capable of receiving information on the vortex generator position, motion parameters, geometrical and weight characteristics from the scenarios database module and the memory unit capable of storing information on the vortex generator position and motion parameters;

The unit for simulation of wake vortices including the wake vortex tracker capable of determining the vortex generator wake vortex path in the form of the set of the vorticity region center trajectories and intensity on the basis of information from the module for simulation of the ambient parameters and module for simulation of vortex generator dynamics and also capable of saving the information on the coordinates of points of the vortex generator wake vortex path in the form of the set of the vorticity region center trajectories and intensity;

and the module for simulation of wake vortex perturbation effects on the aircraft should contain:

The unit for the aircraft schematization capable of calculating the set of the aircraft geometrical characteristics necessary for calculation of the aircraft additional aerodynamic forces and moments induced by the vortex generator wake vortices on the basis of information on the aircraft type and configuration the training scenario database module, and The unit for determination of the above mentioned forces and moments on the basis of the information on the coordinates of points of the vortex generator wake vortex path in the form of the set of the vorticity region center trajectories and intensity saved by the unit for simulation of wake vortices and of information on the aircraft position, flight velocity, angular rates, and geometrical characteristics received from the module for simulation of the aircraft dynamics.

Moreover, the simulator, according to the invention, can additionally contain the module for imitation of noise, optical and dynamic effects.

Moreover, according to the invention, the simulator can be adjusted for training in pilotage under the conditions when the pilot receives information on the forecasted possibility of the aircraft encounter with the vortex generator wake vortex danger area and additionally comprise:

the module of parameters of vortex perturbation danger area including:

the unit for evaluation of perturbation hazard capable of estimating the perturbation hazard level at the given point according to the chosen hazard criteria for the aircraft additional aerodynamic forces and moments induced by the vortex perturbations on the basis of information received from unit for determination of the forces and moments, which belongs to the module for simulation of wake vortex perturbation effects on the aircraft;

the unit for determination of danger points where the additional forces and moments induced by the vortex perturbations are dangerous; the unit is capable of determining the coordinates of points belonging to the danger area according the hazard criteria based on information received from the unit for evaluation of perturbation hazard;

the unit for determination of the vortex perturbation danger area capable of calculating the danger area geometrical characteristics on the basis of information received from the unit for determination of danger points and transmitting the corresponding information;

and the warning module including:

the unit for selection of the delay time capable of calculating the time period within which the aircraft has at least a possibility of a flight evasive maneuver providing evasion of the aircraft from the generator wake danger area after the signal warning against the possibility of wake encounter has been received;

the unit for simulation of the control plane capable of calculating the delay distance, which equals to the distance covered by the aircraft during the delay time, modeling the control plane situated in front of the aircraft perpendicular to its flight direction at the delay distance, and determining the forecasted time necessary for the aircraft to gain the control plane in the inertial frame;

the forecasting unit capable of determining the generator wake path in the form of the set of the generator vorticity region centers with respect to the inertial frame and of the intensity of the generator wake vortices at the forecasted time on the basis of information from the unit for simulation of wake vortices in the module for simulation of vortex situation;

the device for calculation of the intersection points capable of determining the coordinates of the intersection points of the generator wake vortex trajectory and the control plane at the forecasted time of the aircraft flight through it;

the areas and regions forming device capable of forming around the intersection point of the wake vortex path and the control plane of the wake vortex danger area in the form of the set of the generator vorticity danger areas, where the entering aircraft may have the flight parameters exceeding the admissible limits; forming in the control plane of the area of the aircraft forecasted positions at the forecasted time of the aircraft intersection with the control plane with due regard to the flight regulations; forming around the region of the aircraft forecasted positions of the alert area; the information on the entrance of the wake danger areas into the alert area will be provided to the user;

the transformation unit capable of calculating the coordinates of the area of the aircraft forecasted positions, of the alert area and of the wake vortex danger area in the aircraft frame;

the first intersection conditional test unit capable of calculating the distance from the alert area to the wake vortex danger area and marking its nulling;

the second intersection conditional test unit capable of calculating the distance from the area of the aircraft forecasted positions to the wake vortex danger area and marking its nulling;

the indication unit containing at least one indication device capable of indicating the nulling of the distance from the alert area to the generator wake vortex danger area;

the emergency indication unit containing at least one indication device capable of indicating the nulling of the distance from the area of the aircraft forecasted positions to the danger area of the generator wake vortices.

It is appropriate that, according to the invention, the simulator contains the visualization module including a visualization device, for example a display, which is capable of forming the image at least of the area of the aircraft forecasted positions and wake vortex danger areas on the basis of information received from the warning module.

It is desirable that, according to the invention, the indication and emergency indication devices may be chosen from the group containing devices of visual, audio and tactile indication.

Moreover, it is appropriate, that the unit for selection of the delay time in the simulator, according to the invention, could perform the current correction of the delay time in a manual, semiautomatic or automatic mode.

Moreover, according to the invention, it is desirable to develop the areas and regions forming unit with a possibility of performing the current correction of the coordinates of the alert area and area of the aircraft forecasted positions in a manual, semiautomatic or automatic mode.

Moreover, according to the invention, it is preferable that the unit for determination of the danger area parameters could be designed with a possibility of approximating the boundaries of the vortex generator wake vortex danger area.

It is desirable, according to the invention, to choose the aircraft admissible roll moment induced by wake vortices as the hazard criterion.

Moreover, according to the invention, it is possible to choose the admissible value of the aircraft angle of roll as the hazard criterion.

According to the invention, the simulator training scenarios can be chosen out of the group including takeoff and landing at a ground airdrome, take-off and landing at the aircraft carrier, individual and formation flight, and flight refueling.

According to the invention it is preferable that the simulator would be realized in the software of the simulator modules.

Moreover, it would be reasonable, according to the invention, to design the module for simulation of the danger area parameters so it should contain the database of characteristics of wake vortex danger areas for different types of vortex generators.

Moreover, according to the invention, it is desirable that the system for estimation of the pilot actions should contain the memory device for saving information on the coordinates of the control plane, area of the aircraft forecasted positions and wake vortex danger areas of vortex generators located in the aircraft vicinity at least within the time of emergency indication of the nulling event for the distance from the area of the aircraft forecasted positions to the danger area of the vortex generator wake vortices.

BRIEF DESCRIPTION OF THE DRAWINGS

In what follows, the invention is illustrated by description of an example of embodiment of the aircraft simulators, according to the invention, without limitation of the invention implementation within its scope and by the drawings enclosed where.

DESCRIPTION OF THE PREFERRED EMBODIMENTS

Figure 1:
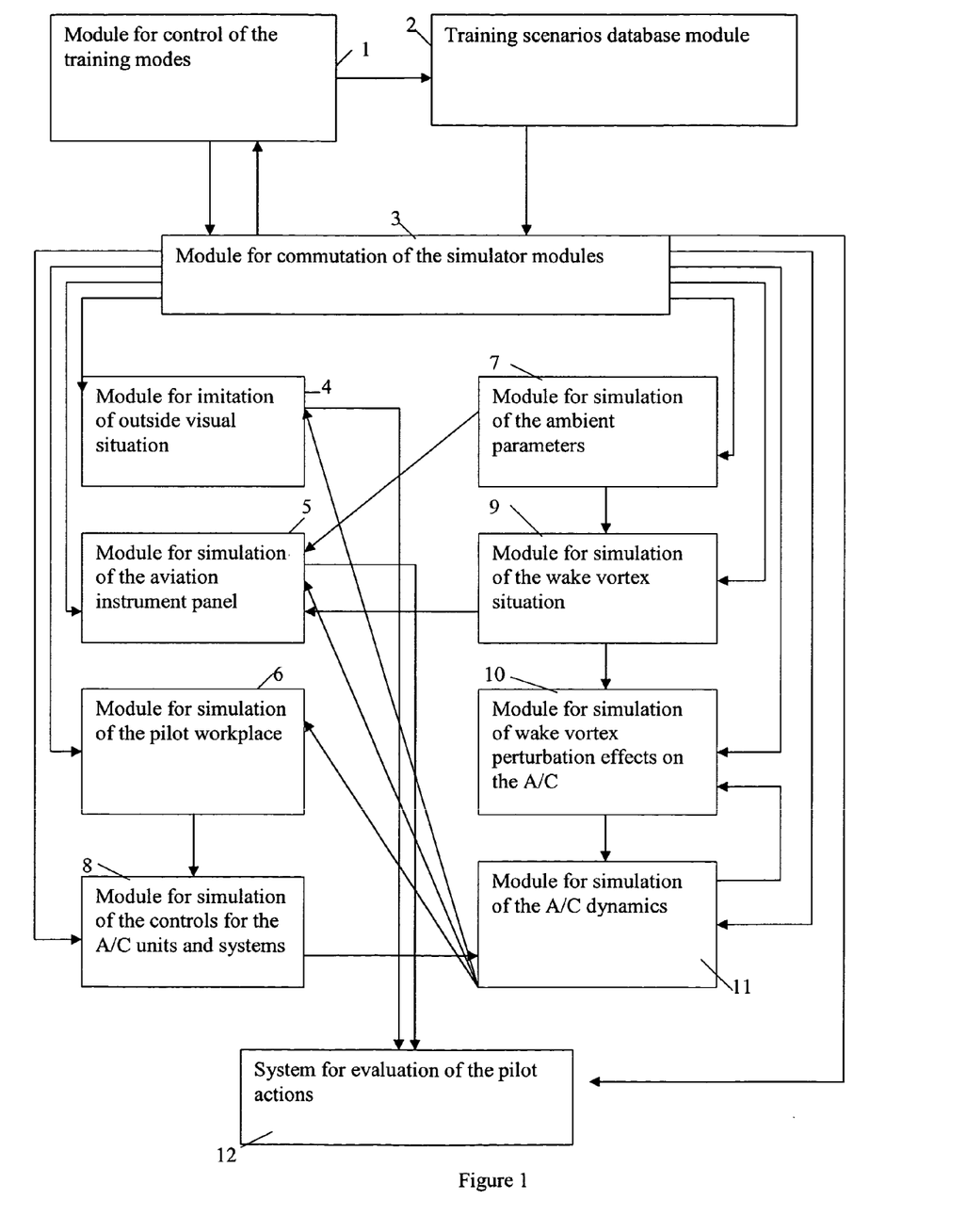
FIG. 1 shows the scheme of the simulator, according to the invention, meant for training in pilotage under wake vortex hazard conditions, a version of embodiment.
Figure 2:
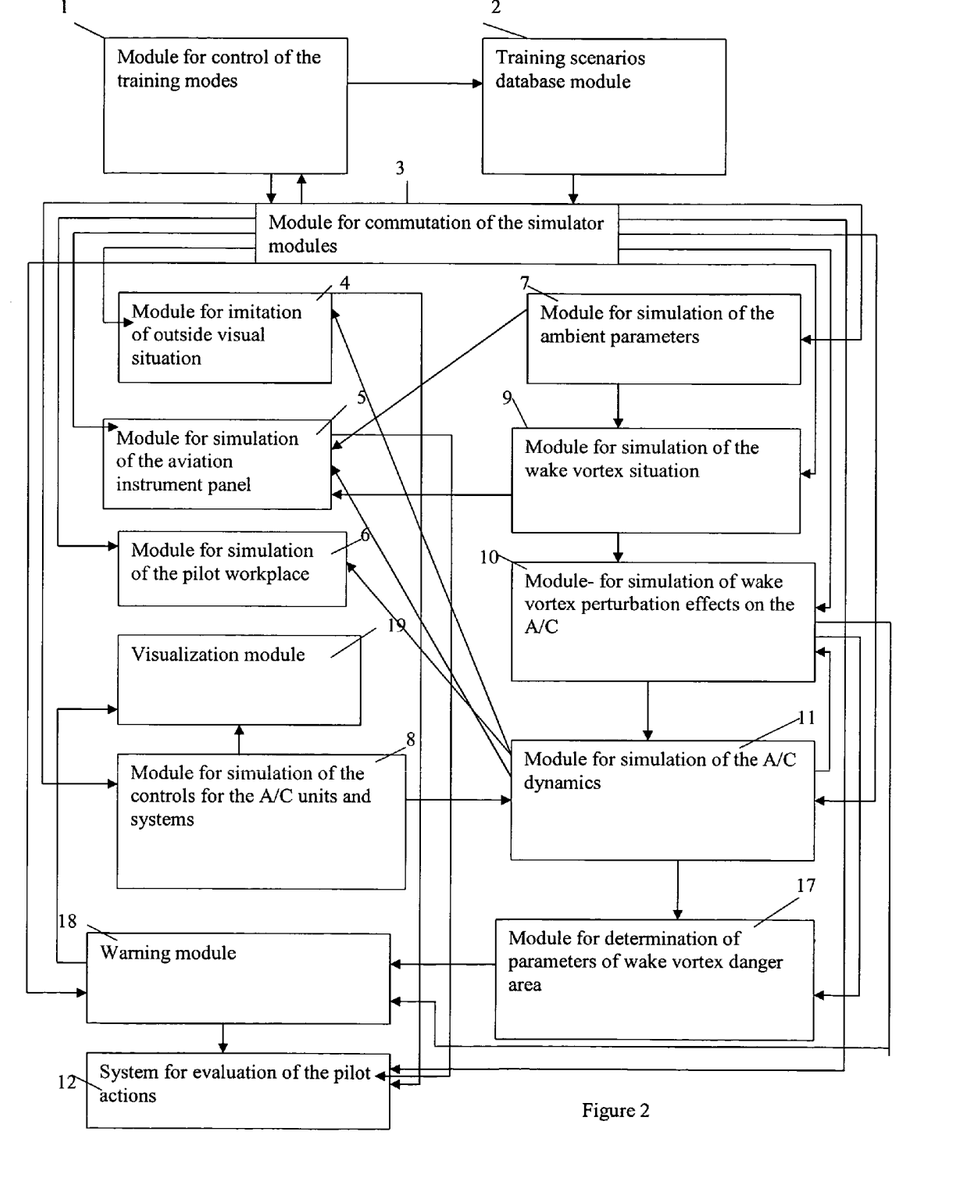
FIG. 2 shows the scheme of the simulators, according to the invention, meant for training in pilotage when the pilot is informed on the possibility of the aircraft encountering with the danger area of the vortex generator wake vortices, a version of embodiment.

As an example of the simulator realization, according to the invention, consider a version of the simulator embodiment meant for training in the aircraft (hereinafter the A/C) pilotage under the conditions of wake vortex hazard (FIG. 1) and a version of the simulator embodiment meant for training in pilotage when the pilot is informed on the possibility of the aircraft encountering with the danger area of the vortex generator wake vortices (FIG. 2).

Simulators (FIGS. 1, 2) contain the module 1 for control of the training modes, the training scenarios database module 2, and the module 3 for commutation of the simulator modules. These modules provide choice of the training scenarios, interaction of all the simulator modules in accordance with the chosen scenario, as well as, if required, correction of their operations with change of the mode parameters.

The module 3 for commutation of the simulator modules transmits information in accordance to the training scenario to the module 4 for imitation of outside visual situation, to the module 5 for simulation of the aviation instrument panel, to the module 6 for simulation of the pilot workplace, to the module 7 for simulation of the ambient parameters in accordance with the scenario of training; then switches on module 8 for simulation of the controls for the A/C units and systems, module 9 for simulation of the wake vortex situation, module 10 for simulation of wake vortex perturbation effects on the A/C, module 11 for simulation of the A/C dynamics and the system for evaluation of the pilot actions.

The module 7 for simulation of the ambient parameters transmits the information on the instrument readings according to the selected scenario to the module 5 for simulation of the aviation instrument panel, and transmits the information on the local wind speed and direction, altitude wind profile, turbulence level and the type of underlying terrain to module 9 for simulation of the wake vortex situation.

Module 9 receives also from the training scenarios database module 2 information on the type of vortex generators (hereinafter the A/C) located in the vicinity of the A/C, their flight velocities, angular rates, and coordinates of the trajectory points, saves this information and then evaluates the trajectories and intensities of the wake vortices generated by the vortex generators as the sets of points of the vorticity region centers, for example by means of calculation algorithms such as the well known calculation algorithm (Northwest Research Associated, Inc., Aircraft Vortex Spacing System (AVOSS), Algorithm Version 3/1/1), or others, calculating coordinates of vorticity region centers on the basis of integration of differential equation describing the evolution of vortex areas in space and time. This information is stored in module 9 and then transmitted to the module 10 for simulation of wake vortex perturbation effects on the A/C.

On the basis of information received from module 9 and information from module 2 on the A/C type, its configuration, position, coordinates, flight velocity and angular rates, as well as on the basis of received from the module 11 for simulation of the A/C dynamics information on the forces acting on the A/C at the current time, module 10 calculates in real time the additional forces and moments induced by the VG wake vortices and transmits this information to the module for simulation of the A/C dynamics, which simulates the corresponding force values and transmits them to module 6 for simulation of the pilot workplace. These additional forces and moments also change, in accordance to the change of the A/C kinematics parameters instrument readings of module 5 and change the picture of outside situation in module 4.

According to the invention, the module 8 for simulation of the controls for the A/C units and systems implements the loading of power units, according to the simulated parameters, to create artificial feel of control corresponding to that in real flight. According to the invention, if the module 6 for simulation of the pilot workplace is equipped with a motion system, the above loading can be simulated as the pilot seat inclination, oscillations, and vibrations. The pilot sensing these perturbations trains in adequate perception of such perturbations with creation of the image of their source and follows the logical links of the perturbations with the changes of the corresponding instrument readings at the instrument panel. The pilot makes the decision to change the A/C position undertaking a certain maneuver with actions on the controls of the module 8 for simulation of the controls for the A/C units and systems. Information on such actions transmits to the module 11 for simulation of the A/C dynamics and further on to the instrument panel changing the instrument readings. After that the pilot actions are estimated by the system 12 for evaluation of the pilot actions, for example on the basis of comparison of standard readings of the instruments with the readings achieved as a result of the pilot actions.

The stimulator, according to the invention, can also contain the module simulating noise, optical and dynamic effects, which favors the training process.

The system 12 for evaluation of the pilot actions can be located, for example at the instructor working place where the instructor can receive from the simulator modules information on the A/C parameters and on the training 'flight' operations, process the flight data on the instructor computer, and represent the pilot actions on the display, forming 3-D pictures of the simulated region of the training flight, for example representing all aircrafts located there and all other ground and air wake vortex generators.

Modules 4, 5, 6, 7, and 8 of the simulator, according to the invention, can be installed, for example in the cabin of a real aircraft imitating the actual situation for the training-pilot; and modules 1, 2, 3, and 12 can be installed, for example at the instructor site to control the training process and for possible correction of training scenarios. The installation place for modules 9, 10, and 11 can be chosen arbitrarily.

Figures 3, 5:
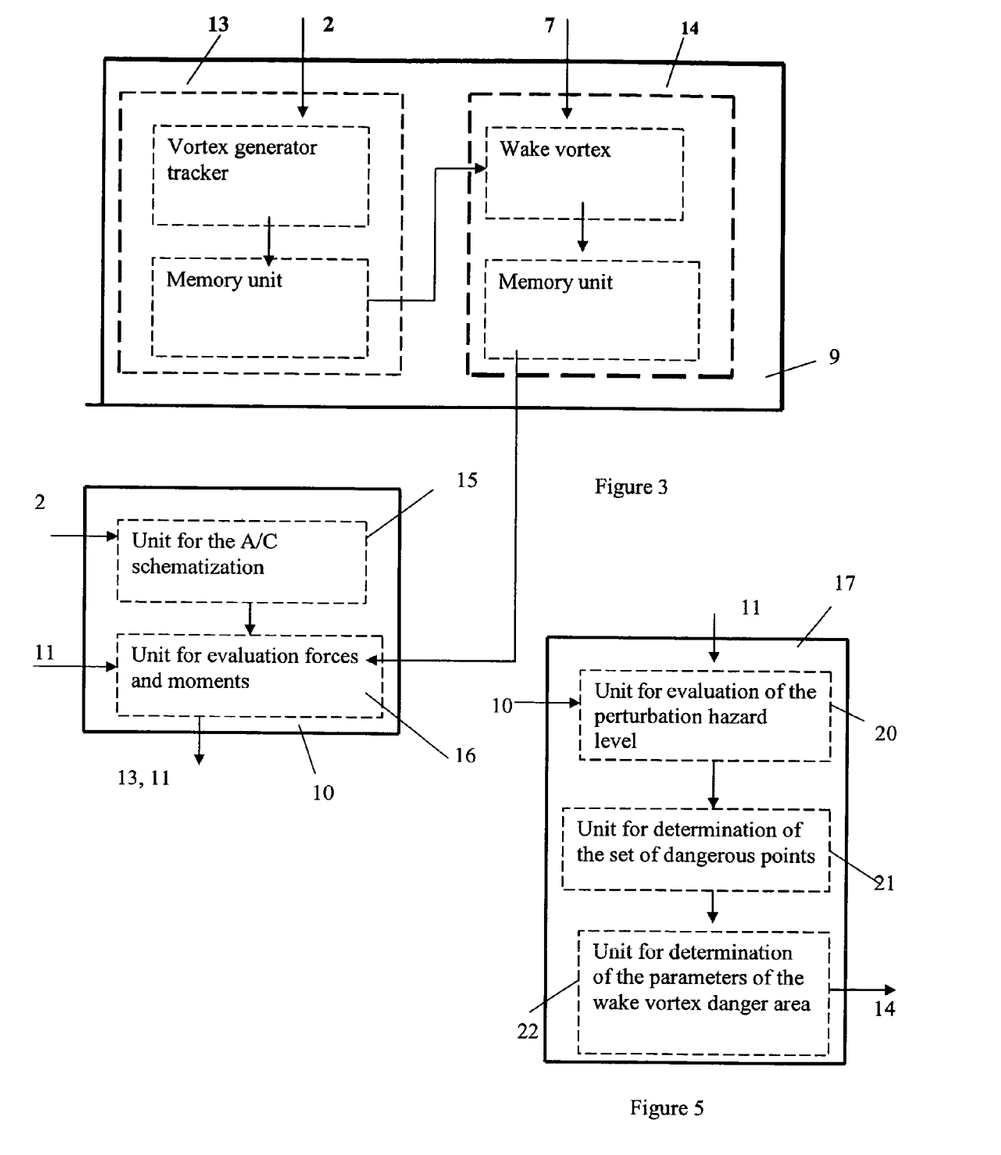
FIG. 3 shows the scheme of the module for simulation of vortex situation and module for simulation of wake vortex perturbation effects on the aircraft, according to the invention, a version of embodiment.
FIG. 5 shows the scheme of the module of vortex perturbation danger area parameters, according to the invention, a version of embodiment.

FIG. 3 shows a version of embodiment for the simulator modules 9 and 10 and their mutual interaction. The module 9 for simulation of the wake vortex situation can contain the unit 13 for simulation wake vortex generator dynamics providing the tracing of VG with receipt of information from the training scenarios database module 2 on the VG type, geometrical and weight data, as well as on position at the current time, and saving the VG trajectory point coordinates and flight velocity. Module 9 can also the unit 14 for simulation of wake vortex dynamics providing on the basis of information received from unit 15 and from the module 7 for simulation of the ambient parameters the calculation of the VG wake vortex trajectory in the form of the set of points of the vorticity region center and intensity with saving the wake vortex trajectory point coordinates and intensity at the current time.

The module 10 for simulation of wake vortex perturbation effects on the A/C (FIG. 3), according to the invention, can contain the unit 15 for the A/C schematization providing on the basis of information received from the training scenarios database module 2 on the A/C configuration, coordinates, flight velocity, angles of pitch, yaw, and roll, calculation of the set of the A/C geometrical data necessary for calculation of the A/C aerodynamic forces and moments, including that induced by wake vortex. Module 10 can also contain the unit 16 for evaluation of the A/C aerodynamic forces and moments on the basis of information received from the unit 14 for simulation of the wake vortex dynamics, from the unit 15 for the A/C schematization, and from the module 11 for simulation of the A/C dynamics.

The simulator for training of pilots under the conditions when the pilot receives information on the forecasted possibility of the A/C encounter with the VG wake vortex danger area (FIG. 2) contains, in addition to the previously described modules, the module 17 for determination of parameters of wake vortex danger area providing evaluation of geometrical parameters of the area dangerous for the A/C with respect to hazard criteria of dynamic influence induced by the vortex perturbations; the warning module 18 providing the modeling of such danger area at the delay distance ahead of the A/C, which the aircraft may overcome within the delay time chosen, for example, by the pilot. The delay time should be sufficient for performing a flight evasive maneuver to avoid the forecasted danger area. To present the information at the forecasted time module 18 provides modeling of the control plane (hereinafter the CP), which is located in front of the A/C at the delay distance, of the forecasted intersection points of the A/C and the CP and the area around them of the A/C forecasted positions (hereinafter the AAFP) at the time of intersection of the A/C with the CP, including the A/C 3-D configuration, as well as of the intersection points of the VG wake vortex trajectories with the CP and forming of the danger areas around these intersection points. Module 18 deals with the possibility of intersection of the AAFP with the wake vortex danger areas in the CP and transmits the emergency signal to the pilot. Module 18 also simulates the alert area (hereinafter the AA) in the CP, the size of which exceeds the AAFP size. The availability of wake vortex danger areas in the AA warns the pilot against a possibility of the A/C encounter with the danger area.

According to the invention, the simulator may be equipped with the module 19 for visualization of the generated information capable of forming the pilot adequate apprehension of visual schematic picture of the wake vortex situation around the A/C and the forecasted change of this situation.

Figure 4:
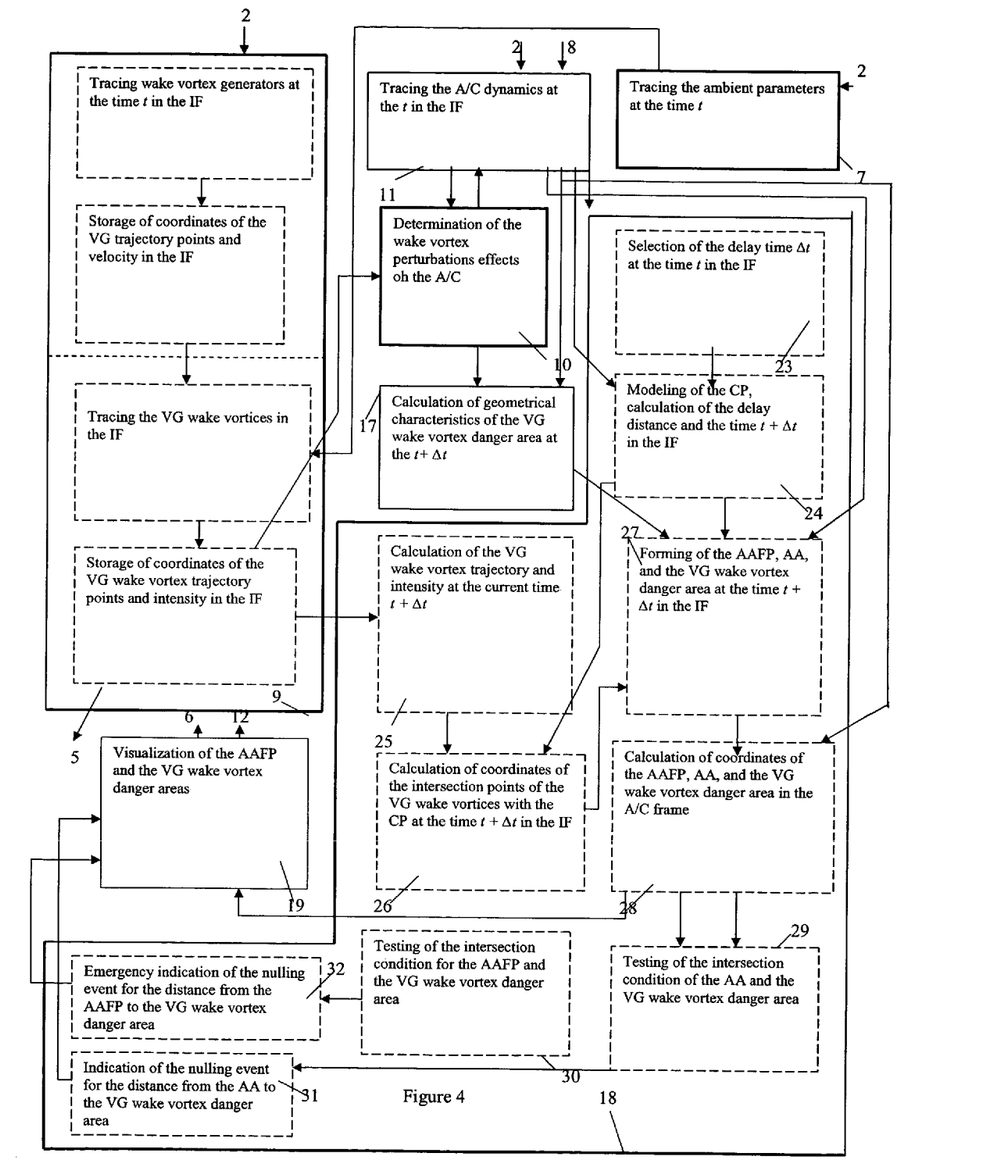
FIG. 4 shows the scheme of realization of the warning module, according to the invention, and its interaction with other modules of the simulator, a version of embodiment.

FIG. 4 illustrates mutual interaction the simulator modules, according to the invention, when training pilots under the information on the wake vortex situation. The module 17 for evaluation of wake vortex danger area parameters, according to the invention, developed according the scheme presented in FIG. 5 processes the current information as follows.

The unit 20 for evaluation of the perturbation hazard level estimates the perturbation hazard level at the given point, according to the specified hazard criteria for the A/C additional forces and moments induced by the VG wake vortex perturbations on the basis of information received from the unit 16 for determination of forces and moments in the module 10 for simulation of wake vortex perturbation effects on the A/C. According to the invention, the A/C roll moment or the roll angle could be chosen as the hazard criterion.

The unit 21 for determination of the set of dangerous points where the additional forces and moments induced by vortex perturbations are dangerous evaluates the coordinates of points belonging to the danger area according to the hazard criterion on the basis of information received from the unit 20 for evaluation of the perturbation hazard level.

The unit 22 for determination of the parameters of the wake vortex danger area calculates the danger area geometrical characteristics on the basis of information received from the unit 21 for determination of the set of dangerous points and transmits this information to the warning module.

According to the invention, the module 17 of vortex perturbation danger areas can contain the database of characteristics of wake vortex danger areas for different types of vortex generators essentially reducing the time for incoming information processing.

The warning module 18 (FIG. 4), according to the invention, forms the information for the pilot, which is adequate for the pilot apprehension of the vortex situation around and in front of the A/C.

The unit 23 for the delay time selection in the warning module 18 selects the time period, within which the aircraft has at least a possibility of a flight evasive maneuver providing evasion of the aircraft from the generator wake danger area after the signal warning against the possibility of wake encounter has been received. According to the invention, the delay time can be corrected in real time by means of manual, semiautomatic or automatic control with due regard for, for example the pilot skills and special features of the flight task according to the training scenario. The control can be carried out by the pilot or by the instructor and gives the possibility of complicating or facilitating the training mode.

Then the unit 24 for modeling of the control plane, on the basis of information received from module 11 on the A/C coordinates, flight velocity, angles of pitch, yaw, and roll and of information received from unit 23 on the chosen delay time, calculates the delay distance, which is equal to the distance covered by the aircraft within the delay time and models the CP located in front of the A/C perpendicular to the flight direction at the delay distance from the A/C, for example in the form of the coefficients of the CP in the inertial frame at the forecasted moment of the A/C intersection with the CP.

The forecasting unit 25, on the basis of information received from module 13 on the VG wake vortex intensity and trajectory in the form of the set of the VG vorticity region center paths and of information received from unit 23 on the delay time, evaluates the VG wake vortex intensity and trajectory of wake vortex with respect to the inertial frame at the forecasted time of the A/C intersection with the CP. The unit 26 for calculation of the intersection points, on the basis of information received from units 25 and 24, determines the coordinates of the intersection points of the VG wake vortex trajectory with the CP at the forecasted time of the A/C intersection with the CP.

The areas and regions forming unit 27, on the basis of information received from unit 26 and module 17, forms around the intersection point of the wake vortex trajectory with the CP the wake vortex danger area, entering into which results in that the A/C flight parameters can exceed the admissible limits, forms in the CP the area of the A/C forecasted positions (hereinafter the AAFP) with due regard for flight standards at the forecasted time of the A/C intersection with the CP, and forms around the AAFP the alert area (hereinafter the AA). The information on entering of the wake vortex danger area into the AA should be transmitted to the pilot. According to the invention, unit 27 gives a possibility of current correction of coordinates of the AAFP and AA, which is very important for the pilot when coordinating the flight evasive maneuver with the flight task.

The transformation unit 28 calculates the coordinates of the AAFP, VG wake vortex danger area, and AA in the A/C frame.

Then the first unit intersection conditional test unit 29 calculates the distance from the AA to the wake vortex danger area and marks its nulling and the second intersection conditional test unit 30 calculates the distance from the AAFP to the wake vortex danger area and marks its nulling.

Information on the above distances nulling at the forecasted time arrives to the indication unit 31 or to the emergency indication unit 32 installed in the module 5 for simulation of the instrumentation panel and/or in the module 6 for simulation of the pilot workplace, for example in the real A/C cabin. For example, if the distance between the AA and the wake vortex danger area equals to zero, the audio indication device at the pilot workplace is switched on, and then, if the distance between the AAFP and the wake vortex danger area equals to zero, for example the tactile emergency indication device installed on the handles of the pilot seat is switched on. The tactile indication should prompt the pilot to undertake urgent measures for carrying out a flight evasive maneuver to avoid the A/C entering the danger area. The pilot has enough time for performing the maneuver assigned by the user with due regard for the A/C flight velocity. Depending on the current situation, after the receipt of the first indication the delay time may be corrected, for example by the pilot, for example by means of manual control setting the digital parameter of the delay time value, or by means of automatic control setting a condition of the delay time change. With the increase of these distances, the indication terminates demonstrating that the A/C is out of danger and removing the pilot stress.

According to the invention, it is appropriate to visualize for the users (the pilot and instructor) the information on mutual location of the AAFP and the danger area in the CP at the forecasted time in the visualization module 19, for example on the display or on the A/C navigation chart. To reduce volume of information non relevant to the pilot the danger areas position should be visualized only after their intersection with the AA.

According to the invention, the module 17 for parameters of wake vortex danger area, as it is shown in FIG. 5, may contain units 20, 21 and 22. The unit 20 for evaluation of the perturbation hazard level, on the basis of information received from the module 10 for simulation of wake vortex perturbation effects on the A/C on forces and moments induced on the A/C by the VG wake vortices and of information received from the module 11 for simulation of the A/C dynamics on the A/C parameters, configuration, position, and velocity, determines, according to the chosen hazard criterion, for example the A/C roll moment or roll angle, the points in the wake vortex vorticity regions where forces and moments induced by the VG wake vortices are dangerous for the A/C at the forecasted time. Unit 21 determines points belonging to the wake vortex danger area and the unit 22 for evaluation of the wake vortex danger area parameters calculates the geometrical characteristics of the danger area as the set of points. According to the invention, it is desirable that the module 13 of danger area parameters could approximate the danger area boundaries. After that information on the danger area parameters arrives to the warning module, is analyzed by means of the method described above and could be transmitted to the visualization module in case of danger for the A/C. For example, a display can serve as the visualization device.

Figure 6:
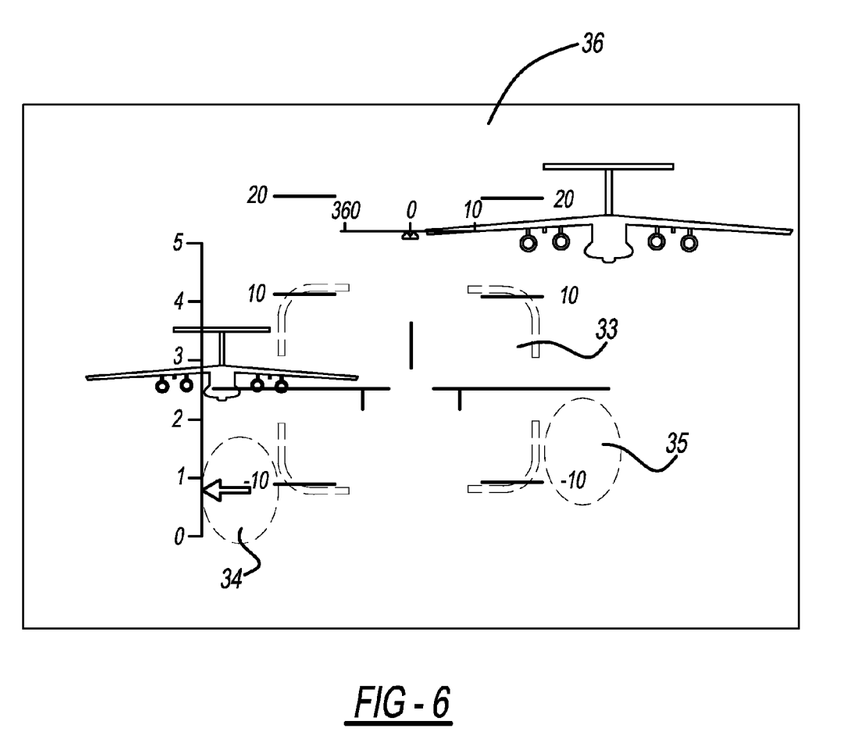
FIG. 6 shows the scheme of representation of information provided by the warning module, the version of presentation on a navigation chart display, according to the invention.

FIG. 6 shows a navigation chart display usually used on the A/C board for indication of the A/C heading and depiction of symbols generated by the onboard inertial navigational system, for example by the Airborne Inertial Navigation System (AINS), with representation of the area 33 of the A/C forecasted positions and the VG wake vortex danger areas 34 and 35 at the forecasted time. The AAFP 33 may have, for example, the squared shape with the sizes proportional to the sizes of the A/C body possible positions. The boundary of the alert area are not shown on the display as, according to the invention, it is appropriate to represent the wake vortex danger areas on the display only in the case that the danger areas intersect with the alert area with simultaneous, for example, sound indication of this event. Therefore, one may consider that the alert area 36 is presented on the display. The wake vortex danger areas 34 and 35 may have the form, for example, of a circle or other geometrical figure convenient for visual perception. The picture may be accompanied by visual indication, for example by light or color indication, of regions 33, 34, and 35 or their boundaries, and in the case of the event of intersection of boundary 33 for the AAFP with the boundary of a region, for example of the danger area 35 may be accompanied by emergency audio indication, for example on the display or the instrument panel, or tactile indication on the handle of the pilot seat.

Of course, though the given example contains only one generator of wake vortices and only one danger area of the single VG, the calculations and tracking of the VG wake vortices could be performed for all VG located in the A/C vicinity, but only those VG wake vortex danger areas should be displayed that could be hazardous for the A/C. The pilot can make an adequate decision on the maneuver removing the A/C from the wake vortex danger areas on the basis of his evaluation of the danger area location on the display.

The use of simulators, according to the invention, creates most favorable conditions for the pilot adequate apprehension of vortex situation, the action on the A/C of the forces and moments induced by vortex perturbations, and understanding of possible consequences of the A/C encounter with the wake vortex danger area. The advantage of the described simulators is in that the pilot receives all the necessary information on wake vortices sufficient for performing an effective flight evasive maneuver to avoid entering into the wake vortex danger area. The preliminary processing of information on wake vortices realized in the present invention reduces the volume of induced information, preserving only its useful part. The training-pilot is provided with information on the A/C position with respect to wake vortices at the forecasted time, with information on the change of the A/C forces and moments caused by the change of the A/C configuration. The operations of the simulator modules are adapted to the situation conditions according to the scenario and the modes of the A/C systems and equipment functioning.

According to the invention, the simulator training scenarios can be chosen from the group including takeoff and landing at a ground airdrome, takeoff and landing at the aircraft carrier, individual and formation flight, flight refueling, and individual low altitude flight with tracking of the relief. This admits of training in different flight operations using a single simulator. According to the invention, the system for estimation of the pilot actions can contain the storage device for information on coordinates of the control plane, area of the aircraft forecasted positions, and the vortex generator wake vortex danger areas located in the vicinity of the aircraft within the time period of emergency indication of the nulling event for the distance from the area of the aircraft forecasted positions to the vortex generator wake vortex danger areas. It is rather useful for performing attestation and qualification tests of pilots, as well as for training in data decoding, for example for training in the data decoding for the so called black box'.

Aviation science community and specialists in avionics and simulators should clearly see that the simulators, according to the invention for training in pilotage under wake vortex hazard and under informing the pilot on a possibility of the A/C encounter with the VG wake vortex danger area, may include improvements and perfections within the scope of the invention claims and subject associated, for example with different equipment of the A/C of different types, with different scenarios for different A/C types, use of different methods and devices for indication and visualization of information for the pilot, as well as with changes in informational flows in accordance with the changes of the simulator equipment.

INDUSTRIAL APPLICABILITY

The simulator, according to the invention, may be realized in software for separate modules, as well as for a system of modules in the united training system, for example, by means of computing devices and personal computers. It is obvious that several training places may be installed in one simulator permitting of varying training scenarios.

We claim:

1. A flight simulator system for training pilots under the conditions when the pilots receive information on a forecasted possibility of an aircraft encounter with a vortex generator wake vortex danger area and additionally, the flight simulator system includes a non-transitory computer readable medium storing computer instructions executable by a processor, the computer instructions comprising:

a module (1) for control of simulator modes is capable of choosing a training scenario and controlling operation of a plurality of simulator modules;

the flight simulator system further includes a training scenarios database module (2);

a module (3) for commutation of the simulator modules;

a module (4) for imitation of an outside visual situation, visual part of an air space and ground surface in real time;

a module (6) for simulation of a pilot workplace;

a module (5) for simulation of an aviation instrument panel with an indication of a plurality of aircraft engine modes;

a module (8) for simulation of a plurality of controls for a plurality of aircraft units and systems;

a module (7) for simulation of a plurality of ambient parameters;

a module (9) for simulation of a wake vortex situation caused by an aircraft is capable of determining a vortex generator wake vortex path as a set of vorticity region centers and intensity on the basis of: information from the training scenarios database module (2) and information from the module (7) for simulation of the ambient parameters;

a module (10) for simulation of wake vortex perturbation effects on the aircraft is capable of evaluation of aircraft additional forces and moments induced by vortex generator wake vortices on the basis of: information on the vortex generator wake vortex path and intensity received from the module (9) for simulation of the wake vortex situation, information on the aircraft parameters received from the training scenarios database module (2), and information on aircraft position, flight velocity, angular rates, and information on the geometrical characteristics received from a module (11) for simulation of aircraft dynamics;

wherein the module (11) for simulation of the aircraft dynamics is capable of forming signals imitating aircraft forces and moments according to the training scenario, as well as additional forces and moments induced by the vortex generator wake vortices, and transmitting the signals to the module (6) for simulation of the pilot workplace, the module (5) for simulation of the aviation instrument panel, and the module (4) for imitation of outside visual situation on the basis of: information from the module (10) for simulation of wake vortex perturbation effects on the aircraft, information from the training scenarios database module (2), and information from the module (8) for simulation of the controls for the aircraft units and systems;

a module (17) of parameters of the vortex perturbation danger area, comprising:

a unit (20) for evaluation of perturbation hazard is capable of estimating a perturbation hazard level at a given point according to a chosen hazard criteria for the aircraft additional aerodynamic forces and moments induced by the vortex perturbations on the basis of: information received from a unit (16) for determination of the forces and moments, which belongs to the module (10) for simulation of wake vortex perturbation effects on the aircraft;

a unit (21) for determination of danger points includes additional forces and moments induced by the vortex perturbations, the unit (21) is capable of determining the coordinates of points belonging to the danger area according the hazard criteria based on information received from the unit (20) for evaluation of perturbation hazard;

a unit (22) for determination of a vortex perturbation danger area is capable of calculating the danger area geometrical characteristics on the basis of: information received from the unit (21) for determination of danger points and transmitting the corresponding information; and a warning module (18), comprising:

a unit (23) for selection of a delay time is capable of calculating a time period within which the aircraft has at least a possibility of a flight evasive maneuver providing evasion of the aircraft from the generator wake danger area after a signal warning against the possibility of wake encounter has been received;

a unit (24) for simulation of a control plane is capable of calculating a delay distance, which equals to a distance covered by the aircraft during the delay time, modeling the control plane situated in front of the aircraft perpendicular to its flight direction at the delay distance, and determining a forecasted time necessary for the aircraft to gain the control plane in an inertial frame;

a forecasting unit (25) is capable of determining a generator wake path in the set of the generator vorticity region centers with respect to the inertial frame and of the intensity of the generator wake vortices at the forecasted time on the basis of: information from the module (9) for simulation of a wake vortex situation;

a unit (26) for calculation of intersection points is capable of determining a coordinates of intersection points of a generator wake vortex trajectory and the control plane at the forecasted time of the aircraft flight through it;

an areas and regions forming unit (27) is capable of forming around an intersection point of the wake vortex path and the control plane of the wake vortex danger area in a set of the generator vorticity danger areas, where an entering aircraft have the flight parameters exceeding admissible limits, forming in the control plane of an area of aircraft forecasted positions at the forecasted time of the aircraft intersection with the control plane with due regard to flight regulations, forming around the region of the aircraft forecasted positions of an alert area, information on entrance of the wake danger areas into the alert area will be provided to the user;

a transformation unit (28) is capable of calculating coordinates of the area of the aircraft forecasted positions, the alert area, and the wake vortex danger area in an aircraft frame;

a first intersection conditional test unit (29) is capable of calculating a distance from the alert area to the wake vortex danger area and marking its nulling;

a second intersection conditional test unit (30) is capable of calculating a distance from the area of the aircraft forecasted positions to the wake vortex danger area and marking its nulling;

the flight simulator system additionally includes:

a system (12) for evaluation of pilot actions is capable of estimating correctness of the pilot actions against the flight situation hazardous for the aircraft on the basis of: information received from the module (4) for imitation of outside visual situation and information from the module (5) for simulation of the instrument panel;

an indication unit (31) containing at least one indication device is capable of indicating the nulling of the distance from the alert area to the generator wake vortex danger area;

an emergency indication unit (32) containing at least one emergency indication device is capable of indicating the nulling of the distance from the area of the aircraft forecasted positions to the danger area of the generator wake vortices and the emergency indication device is capable of indicating the nulling of the distance from the alert area to the generator wake vortex danger area, wherein the emergency indication is selected from a group consisting of: visual, audio and tactile indication;

an effect module for simulation of noise, optical and dynamic effects; and a visualization module including a visualization device capable of forming images of the area of the aircraft forecasted positions and wake vortex danger areas on the basis of: information received from the warning module; wherein the image of the area of the aircraft forecasted positions is represented by a first geometric shape; wherein the image of the wake vortex danger areas is represented by a second geometric shape; a warning is issued by the warning module when the first and second geometric shapes intersect.

2. The simulator as claimed in claim 1,
wherein the unit (23) for selection of the delay time capable of adjusting the delay time in a manual, semiautomatic or automatic mode;
wherein the unit (27) capable of adjusting the coordinates of the alert area and area of the aircraft forecasted positions in a manual, semiautomatic or automatic mode, and
wherein the unit (22) capable of approximating the boundaries of the vortex generator wake vortex danger area.

3. The simulator as claimed in claim 1, wherein the aircraft admissible roll moment induced by wake vortices is chosen based on the hazard criterion.

4. The simulator as claimed in claim 1, wherein the admissible value of the aircraft roll angle is chosen based on the hazard criterion.

5. The simulator as claimed in claim 1, wherein the module (7) for simulation of the danger area parameters comprises the database of characteristics of wake vortex danger areas for different types of vortex generators.

6. The simulator as claimed in claim 1, wherein the system (12) for estimation of the pilot actions further comprises a memory device for saving information on the coordinates of the control plane, area of the aircraft forecasted positions and wake vortex danger areas of vortex generators located in the aircraft vicinity at least within the time of emergency indication of the nulling event for the distance from the area of the aircraft forecasted positions to the danger area of the vortex generator wake vortices.

7. A flight simulator system for training pilots under wake vortex danger conditions, the flight simulator system includes a non-transitory computer readable medium storing computer instructions executable by a processor, the computer instructions comprising:

a module (1) for control of simulator modes is capable of choosing a training scenario and controlling operation of a plurality of simulator modules;

the flight simulator system further includes a training scenarios database module (2);

a module (3) for commutation of the simulator modules;

a module (4) for imitation of an outside visual situation, a visual part of an air space and a ground surface in real time;

a module (6) for simulation of a pilot workplace;

a module (5) for simulation of an aviation instrument panel with indication of a plurality of aircraft engine modes;

a module (8) for simulation of a plurality of controls for a plurality of aircraft units and systems;

a module (7) for simulation of a plurality of ambient parameters;

a module (9) for simulation of a wake vortex situation caused by an aircraft is capable of determining a vortex generator wake vortex path as a set of vorticity region centers and intensity on the basis of: information from the training scenarios database module (2) and information from the module (7) for simulation of the ambient parameters;

a module (10) for simulation of wake vortex perturbation effects on the aircraft is capable of evaluation of aircraft additional forces and moments induced by the vortex generator wake vortices on the basis of: information on the vortex generator wake vortex path and intensity received from the module (9) for simulation of the wake vortex situation, information on the aircraft parameters received from the training scenarios database module (2), information on aircraft position, flight velocity, angular rates, and information on the geometrical characteristics received from a module (11) for simulation of aircraft dynamics;

wherein the module (11) for simulation of the aircraft dynamics is capable of forming signals imitating aircraft forces and moments according to the training scenario, as well as additional forces and moments induced by the vortex generator wake vortices, and transmitting the signals to the module (6) for simulation of the pilot workplace, the module (5) for simulation of the aviation instrument panel, and the module (4) for imitation of outside visual situation on the basis of: information from the module (10) for simulation of wake vortex perturbation effects on the aircraft, information from the training scenarios database module (2), and information from the module (8) for simulation of the controls for the aircraft units and systems;

the flight simulator system additionally includes:

a system (12) for evaluation of a plurality of pilot actions is capable of estimating correctness of the pilot actions against flight situation hazardous for the aircraft on the basis of: information received from the module (4) for imitation of outside visual situation and information from the module (5) for simulation of the instrument panel;

a module (13) for simulation of vortex generator dynamics including a vortex generator tracker is capable of receiving information on a vortex generator position, motion parameters, geometrical and weight characteristics from the scenarios database module (2);

a unit (14) for simulation of wake vortices including a wake vortex tracker is capable of determining a vortex generator wake vortex path in a set of vorticity region center trajectories and intensity on the basis of: information from the module (7) for simulation of the ambient parameters and information from the module (13) for simulation of vortex generator dynamics; and the module (13) further includes a memory unit capable of storing information on the vortex generator position and motion parameters; and information on coordinates of points of the vortex generator wake vortex path in the set of vorticity region center trajectories and intensity;

the module (10) for simulation of wake vortex perturbation effects on the aircraft comprises:

a unit (15) for an aircraft schematization is capable of calculating a set of aircraft geometrical characteristics necessary for calculation of aircraft additional aerodynamic forces and moments induced by the vortex generator wake vortices on the basis of: information on the aircraft type and configuration information from the training scenario database module (2);

a unit (16) for determination of the aircraft additional forces and moments on the basis of: information on the coordinates of points of the vortex generator wake vortex path in the set of the vorticity region center trajectories and intensity saved by the unit (13) for simulation of wake vortices, information on the aircraft position, flight velocity, angular rates, and information on the geometrical characteristics received from the module (11) for simulation of the aircraft dynamics; and a visualization module including a visualization device is capable of forming images of the area of the aircraft forecasted positions and wake vortex danger areas on the basis of: information received from a warning module; wherein the image of the area of the aircraft forecasted positions is represented by a first geometric shape; wherein the image of the wake vortex danger areas is represented by a second geometric shape; wherein when the first and second geometric shapes intersect, a warning is issued by the warning module.

* * * * *